(12) United States Patent
Chung et al.

(10) Patent No.: US 6,621,933 B2
(45) Date of Patent: Sep. 16, 2003

(54) MPEG2 MOVING PICTURE ENCODING/DECODING SYSTEM

(75) Inventors: Tae-yun Chung, Kwachun (KR); Young-nam Oh, Sungman (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/863,255

(22) Filed: May 24, 2001

(65) Prior Publication Data

US 2001/0021260 A1 Sep. 13, 2001

Related U.S. Application Data

(63) Continuation of application No. 09/136,685, filed on Aug. 19, 1998.

(30) Foreign Application Priority Data

Aug. 20, 1997 (KR) ........................................ 1997-039481

(51) Int. Cl.[7] ................................................. G06K 9/00
(52) U.S. Cl. ....................... 382/233; 382/250; 382/100; 380/56; 375/240.23
(58) Field of Search ................................. 382/100, 107, 382/106, 232, 233, 235, 236, 239, 103, 250; 386/95, 125, 94; 713/176, 164, 165; 375/240.21, 240.23; 380/205, 200, 202, 217, 28, 56

(56) References Cited

U.S. PATENT DOCUMENTS

| | | | |
|---|---|---|---|
| 5,613,004 A | * | 3/1997 | Cooperman et al. .......... 380/28 |
| 5,687,236 A | * | 11/1997 | Moskowitz et al. .......... 380/28 |
| 5,809,139 A | | 9/1998 | Girod et al. |
| 6,018,611 A | * | 1/2000 | Nogami et al. ................ 386/52 |
| 6,037,984 A | * | 3/2000 | Isnardi et al. .......... 375/240.21 |

OTHER PUBLICATIONS

Watermarking of MPEG–2 encoded video without decoding and re–encoding, by Frank Hartung et al, SPIE 3020, Multimedial computing and networking, Feb. 1997, pp. 264–274.*

Digital Watermarking of Raw and Compressed Video, by Frank Hartung et al, SPIE2952, Digital Compression and systems for video communications, Sep. 1996, pp. 205–213.*

* cited by examiner

Primary Examiner—Bhavesh M. Mehta
Assistant Examiner—Seyed Azarian
(74) Attorney, Agent, or Firm—Staas & Halsey LLP

(57) ABSTRACT

An MPEG2 moving picture and encoding/decoding system to provide digital copy protection of digital moving picture data. The MPEG2 moving picture encoder discrete cosine transforms a video input signal and uses a digital watermark inserter to embed digital watermark information on a frequency domain of the discrete cosine transformed video input signal. The MPEG2 moving picture decoder receives the encoded video output signal from the MPEG2 moving picture encoder and removes the embedded visual watermark information to locally decode the encoded video signal.

27 Claims, 8 Drawing Sheets

MPEG2 MOVING PICTURE ENCODING/DECODING SYSTEM

CROSS-REFERENCE TO RELATED APPLICATIONS

This application is a Continuation of U.S. patent application Ser. No. 09/136,685 filed Aug. 19, 1998, which claims the benefit of Korean Application No. 1997-039481, filed Aug. 20, 1997, in the Korean Industrial Property Office, the disclosures of which are incorporated herein by reference.

BACKGROUND OF THE INVENTION

1. Field of the Invention

The present invention can be used for a Moving Picture Experts Group (MPEG) moving picture compression/decompression application of motion prediction/compensation based on a discrete cosine transform and minimizes degradation of image quality.

This invention relates to a digital copy protection application of moving picture data which is seldom removed intentionally or unintentionally by a user except an author, and more particularly, relates to an MPEG2 moving picture encoder/decoder.

2. Description of the Related Art

The MPEG2 standard is a compression/decompression standard for video applications, and exploits temporal redundancy for motion compensated interpolated and predicted encoding. That is, the assumption is made that "locally" the current picture can be modeled as a translation of the picture at a previous and/or future time. "Locally" means that the amplitude and direction of the displacement are not the same everywhere in the picture.

The MPEG2 standard specifies predicted and interpolated interframe encoding and spatial domain intraframe encoding. It has block based motion compensation for the reduction of temporal redundancy, and a block based Discrete Cosine Transform based on compression for the reduction of spatial redundancy.

The information relative to motion is based on a 16×16 array of pixels and is transmitted with the spatial information. Motion information is compressed with variable length codes, such as Huffman codes.

Recently, audio/video information expressed as digital information is becoming more widely used and a method utilizing digital products also has been increasing accordingly as digitalization of the A/V application and popularity of the Internet have been increasing rapidly.

Specifically anybody who is able to use a PC can copy/edit digital products easily and accordingly a social issue of illegal copying has been raised. A watermark technique has become prominent as a solution to prevent this problem.

There are two exemplary methods for providing copy protection of digital A/V data to prevent illegal copying. The first method is encryption, i.e., a copy protection method by scrambling the digital information. The second method is a digital watermark method with the purpose of preventing the illegal use of digital information.

The first method is a technique for prevention of illegal copying of digital A/V data, by providing descramble information and password information capable of accessing and running the A/V product only in the case that the A/V product is bought legally.

The second method is a technique which utilizes self-restraint by a user to not produce an illegal copy of the A/V product by embedding ID information or a logo in a state of noise into A/V contents data of the A/V product for the purpose of forbidding the illegal or commercial use of digital information. The watermark technique is used on the original image and is invisible to a person who would copy it, but the author can prove that the copied image is his by virtue of an arbitrary reverse processing.

For example, in a case where a counterfeiter forges money using a color copier, a vignette on the original bill turns clear by copying the bill, and consequently, it makes it virtually impossible to copy a bank note. This is called a visible watermark.

Also, in the case where a spy writes a message onto paper with salt water, other people think this is ordinary paper, but this paper is a medium having important information for the spy. The spy can see the message anytime he wants to see by heating the paper. In this case, we call it an invisible watermark.

At present, the watermark technique is used for digital still images or audio, i.e., putting the message distinguishable from the original image into the image. Therefore, in case that an author's own image circulates illegally, the image can be proved to be that of author by performing an arbitrary reverse processing.

Thus, techniques for preventing the illegal copying of digital product are increasingly being studied these days.

FIGS. 1 and 2 illustrate a conventional MPEG2 moving picture encoder and decoder respectively. FIG. 3 illustrates a structure of a video picture used in the MPEG2 moving picture encoder/decoder and, FIG. 4 illustrates three types of pictures and their relationship under the MPEG2 standard. We will explain the conventional MPEG2 moving picture encoder and decoder by referring to these figures.

MPEG encoding is a hybrid type lossy coding technique wherein the redundancy information which the image signals have in the spatial domain and the temporal domain are removed and the data are compressed (refer to FIG. 3). At this time, the compression technique of spatial domain is called intra-coding and the image data used in intra-coding are called intra-picture (in short, I picture). The compression technique of temporal domain is called inter-coding and in this case, the image data are classified by two according to two prediction methods. The first one is a predicted picture (P picture) wherein prediction error rate of a forward direction is encoded, and the second one is an interpolated picture or bi-directional picture (B picture) wherein a prediction error rate of the bi-directional direction is encoded.

In other words, the I picture is encoded independently of other near pictures (in this instance, the picture is a frame signal or a field signal). In the P picture, the difference signals of predicted/interpolated movement are encoded only after considering the correlation of the movement of the previous I picture or P picture. In the B picture, the difference signals of predicted/interpolated movement are coded only after considering the correlation of the movement of the previous I or P picture and the next I or P picture.

Among the three modes, that is, the forward direction mode, backward direction mode, and forward and backward direction mode, the mode having the smallest value of prediction error rate is selected in the prediction/interpolation method of the B picture.

The picture structure of the MPEG recommendation (called a main profile, main level; MP@ML) is I, B, B, P, B, B, P . . . pictures and needs a frame memory 110 which can store at least three pictures (the cycle of a picture).

A field/frame adaptive coding method is possible in an MPEG2 encoding method so as to increase coding efficiency. The unit of the picture can be defined as a field or frame according to the purpose of the encoding. A frame/field memory 112 stores the field data or frame data to be coded.

A subtractor 134 receives the field data or frame data from the frame/field memory 112 and interpolated predicted motion data from an adaptive estimator 130, to perform a subtraction of local decoded I or P pictures, wherein the motion prediction is interpolated to encode the prediction error rate of the P and B pictures, and the pictures which are now input. A Discrete Cosine Transform (DCT) 114 performs an orthogonal transform which transforms image signals from the subtractor 134 spatially structured into image signals of the frequency domain. A quantizer 116 approximates signals to a typical value to map the DCT-transformed image signals to a code book which is defined in a variable length coder (VLC). Data loss occurs in the quantizer 116.

A dequantizer 122 performs an inverse process of the quantizer 116 for encoding the prediction error rate of P and B pictures. An inverse DCT (IDCT) 124 performs an inverse process of the DCT 114 for encoding the prediction error rate of the P and B pictures. A subtractor 126 performs a subtraction operation on the output from the IDCT 124 and the interpolated predicted output from the adaptive estimator 130. A frame memory 128 stores local decoding images output from the subtractor 126 according to the dequantizer 122 and the IDCT 124.

A motion estimator 132 encodes the prediction error rate of the P and B pictures output from the frame/field memory 112 and the adaptive estimator 130 is a motion compensator which interpolates predicted motion, providing its output to the subtractors 126 and 134.

An activity calculator 118 reflects the characteristics of the complexity of the input images to the quantizer 116 and a rate controller 120 sets up the quantizer 116 so that an overflow/underflow of an output buffer 138 does not happen. A VLC & MUX (variable length coder and multiplexer) 136 entropy encodes and multiplexes the signals output from the rate controller 120, the quantizer 116 and the motion estimator 130. The output buffer 138 provides a buffer for the MPEG coded bit stream output from the VLC & MUX 136.

FIG. 2 shows the conventional MPEG2 moving picture decoder. A buffer 150 stores the coded bit stream. A VLD (variable length decoder) & DEMUX 152 performs an inverse process of the VLC & MUX 136 (of FIG. 1) to decode the MPEG coded bit stream. A dequantizer 154 dequantizes the coded MPEG coded bit stream output from the VLD & DEMUX 152, and an IDCT 156 performs an inverse process of DCT of the output of the dequantizer 154. Adder 160 adds the output of the IDCT 156 with an output of a multiplexer (MUX) 170. A previous picture store 162 is a memory for motion compensation of the P or B picture output from the adder 160. A future picture store 164 is a memory for motion compensation of the P picture output from the adder 160. An adder 166 performs an addition of the outputs of the previous picture store 162 and the future picture store 164 when the motion prediction of the B picture is bidirectional. A ½ multiplier 168 multiplies the interpolation of average values when the motion prediction of the B picture is bidirectional, and the MUX 170 multiplexes the outputs of the previous picture store 162, the ½ multiplier 168, the future picture storer and a "0" bit.

One picture can be divided into uniformly sized regular square areas and each area is transformed. Therefore, the image is divided into image ingredients of different frequencies from an average value (DC value) to an image ingredient value of an extremely high frequency. This division process is called an orthogonal transformation and the orthogonal transformation is a discrete cosine transform (DCT).

Orthogonal transformations, because they have a frequency domain interpretation, are filter bank oriented. This means that the purpose of the DCT is to reduce the correlation of the image information. Since each DCT-transformed coefficient indicates individual frequency information, the correlation of adjacent coefficients is rare. The discrete cosine transform is also localized. That is, an encoding process illustrates samples on an 8×8 spatial window which is sufficient to compute 64 transform coefficients or sub-bands.

Another advantage of the discrete cosine transform is that fast encoding and decoding algorithms are available. Additionally, the sub-band decomposition of the discrete cosine transform is sufficiently well behaved to allow effective use of psychovisual criteria.

After the discrete cosine transform, many of the higher frequency coefficients are zero. These coefficients are organized into a zigzag, as illustrated in FIG. 5, and converted into run-amplitude (run-level) pairs. Each pair indicates the number of zero coefficients. This is coded in a variable length code.

Discrete cosine transform encoding is carried out in the three stages as illustrated in FIG. 5. The first stage is the computation of the discrete cosine transform coefficients. The second stage is the quantization of the coefficients. The third stage is the conversion of the quantized transformation coefficients into run-amplitude pairs after reorganization of the data into a zigzag scanning order.

Quantization can be viewed as a shift to the right by several bits. Quantization enables a very high degree of compression, and a high output bit rate, and retains high picture quality. Quantization can be adaptive with an I picture having fine quantization to avoid "blockiness" in the reconstructed image. This is important because I pictures contain energy at all frequencies. By way of contrast, P and B pictures contain predominately high frequency energy and can be coded at a coarser quantization.

One challenge facing decoder designers is the accommodation of a single decoder system to a variety of display output formats, while complying fully with luminance/chrominance relationships and the MPEG2 standard. The displayed output of the decoder chip must conform to Consultative Committee International Radio (CCIR) recommendation 601. This specifies the number of luminance and chrominance pixels in a single active line, and also how the chrominance pixels are subsampled relative to the luminance signals.

The format defined as 4:2:2 is supported in most cases in industry. This defines 720 active luminance signals, and 360 color differentiated signals, where each line of luminance signals has a corresponding line of chrominance signals. CCIR recommendation 656 goes on to define the number of active lines for National Television System Committee (NTSC) and Phase Alternation by Line (PAL) environments as 480 and 576, respectively. The contents as noted above are disclosed in U.S. Pat. No. 5,668,599.

The MPEG2 moving picture encoder 100 performs an encoding method by utilizing the cooperation of an intracoding method on the spatial domain and an intercoding method on the temporal domain. The MPEG2 moving picture encoder 100 performs the intracoding method on the spatial domain by compressing the original image into a variable length coding of a Huffman code through the DCT 114 and the quantizer 116 and transmits the variable length code.

The MPEG2 moving picture encoder 100 performs the intercoding method on the temporal domain by decompressing the I picture compressed on the spatial domain through the dequantizer 122 and the Inverse Discrete Cosine Transform (IDCT) 124, and predicts by comparing the compressed I picture with the image being input at present through the frame memory 128 and the adaptation estimator 130, and then encodes a difference signal with the original signal by compensating motion, i.e., spatial-shifting the image being input at present as much as the predicted motion.

In the case that a method predicting motion is forward prediction, we call it the P picture and in case that a method predicting motion contains all of forward and backward predictions, we call it the B picture. Accordingly, motion prediction and compensation of P and B images are affected by the picture accuracy coded as the I picture. So, in the decoding process decoding the encoded image, first, the I picture must be decoded exactly so that the P and B images, to which the difference signals are transmitted, can be decoded accurately.

But even through the use of the copy preventing technique by encryption and scrambling as noted above, it is possible to easily copy data when duplication and key data are known. And also the watermark technique for moving picture data has some problems which can reduce encoding efficiency by embedding ID information and a logo in the form of noise.

The picture structure of an MPEG2 moving picture encoding method, as illustrated in FIG. 4, includes an intraframe (I picture) reducing spatial redundancy information of image information, a predicted frame (P picture) reducing interrelation between frames through forward prediction, and an interpolated frame (B picture) reducing between frames through bidirection prediction.

Therefore, in the decoding of the image signal, only in the case where the decoded previous I picture exists, can the P picture be decoded perfectly through motion compensation, and only in the case where the decoded I and P pictures are used in B picture prediction in the encoding process, can the B picture be decoded through motion decoding.

Up to now, digital watermark information discrete-cosine-transformed in the form of noise is embedded into an original image and an I picture codes this digital watermark information.

And the case of predicting motion of the P and B pictures is performed according to encoding locally the I picture. Consequently there is a problem of an error while estimating motion of the P and B pictures by the mixed watermark information.

Because the watermark technique for still images, which has started to be studied recently as noted above, includes watermark data on the spatial domain, the watermark technique is not suitable for an MPEG encoding method compressing data by removing redundancy information in accordance with using interrelation of data on the spatial domain and the temporal domain.

That is, in case the image quality of the image that contains the watermark information deteriorates conspicuously in comparison with the image quality where watermark information is not contained, the meaning can be lost because the image can deteriorate even though the original object contains watermark information.

Thus, the image containing the watermark information has to appear very similar to the image which does not contain the watermark information.

SUMMARY OF THE INVENTION

The present invention is devised to solve the above-noted problems and can be used by MPEG moving picture compression/decompression applications of motion prediction/compensation based on the discrete cosine transform.

Accordingly, it is a first object of the invention to provide a digital copy protection apparatus of moving picture data that makes it difficult to get rid of watermark information by a user except an author, in accordance with minimizing degradation of pixels.

A second object of the present invention provides an MPEG2 moving picture encoder and a third object of the present invention provides an MPEG2 moving picture decoder.

Also, a fourth object provides an MPEG2 moving picture encoding/decoding system with the encoder and the decoder.

Additional objects and advantages of the invention will be set forth in part in the description which follows and, in part, will be obvious from the description, or may be learned by practice of the invention.

According to a first aspect of the present invention to achieve the second object, an MPEG2 moving picture encoder includes a frame memory, a frame/field memory, an activity calculator, a rate controller, a Discrete Cosine Transform (DCT) unit, a quantizer, a dequantizer, an Inverse Discrete Cosine Transform (IDCT) unit, an adaptation predictor, a motion predictor, a variable length Coding & Multiplexer VLC & MUX and a buffer, and further includes a digital watermark inserter to generate and discrete-cosine-transform a digital watermark on a frequency domain and is installed between the DCT and the VLC & MUX; and a digital watermark remover to remove digital watermark information on a spatial domain of the DCT embedded for preventing an error while estimating motion on a temporal domain for P and B pictures by being installed between the dequantizer and the IDCT.

In a second aspect of the present invention to achieve the third object, an MPEG2 moving picture decoder includes a first buffer to receive and save an encoding bit stream; a variable length decoder and demultiplexer (VLD & DEMUX) to receive the encoding bit stream from the first buffer and to various-length-code, and then output the various-length-coded bit stream; a dequantizer to receive and dequantize the various-length-coded bit stream output from the VLD & DEMUX; a digital watermark remover to remove the digital watermark which has been embedded, to locally decode by reading watermark information and information from the dequantizer; a first inverse-discrete cosine-transform IDCT to inverse-discrete-cosine-transform the signal from the digital watermark remover; a digital watermark inserter to again embed the digital watermark removed by the digital watermark remover for performing local decoding, for the purpose of the decoding output; a second IDCT to inverse-discrete-cosine-transform the information from the digital watermark inserter; a second buffer, when the video signal decoded from the second IDCT and the motion compensation data are added and then the picture in which the digital watermark is embedded is replayed, saving temporarily and outputting it; a multiplexer (MUX); a previous picture store block in which the first IDCT output and the MUX output are added and saved temporarily; and a future picture store block in which the first IDCT output and the MUX output are added and saved temporarily, to transmit the saved value into the previous picture store block.

It is preferable that the MUX receives the signal from the previous picture storing block, and receives the signal from the future picture storing block, and receives the signal 0, and receives the signal which is generated after the signals from the two blocks are added and ½ multiplied (treated).

And according to a third aspect of the present invention to achieve the fourth object, in an MPEG2 moving picture encoding/decoding system, includes an MPEG2 moving picture encoder, to output an encoded bit stream after inputting and encoding a video input signal, the MPEG moving picture encoder including copy protection means using a watermark for MPEG2 moving picture data; and an MPEG2 moving picture decoder, to decode the encoded bit stream from the MPEG2 moving picture encoder to output a decoded video signal, the decoder including means for replaying perfectly the image into which the watermark is embedded.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
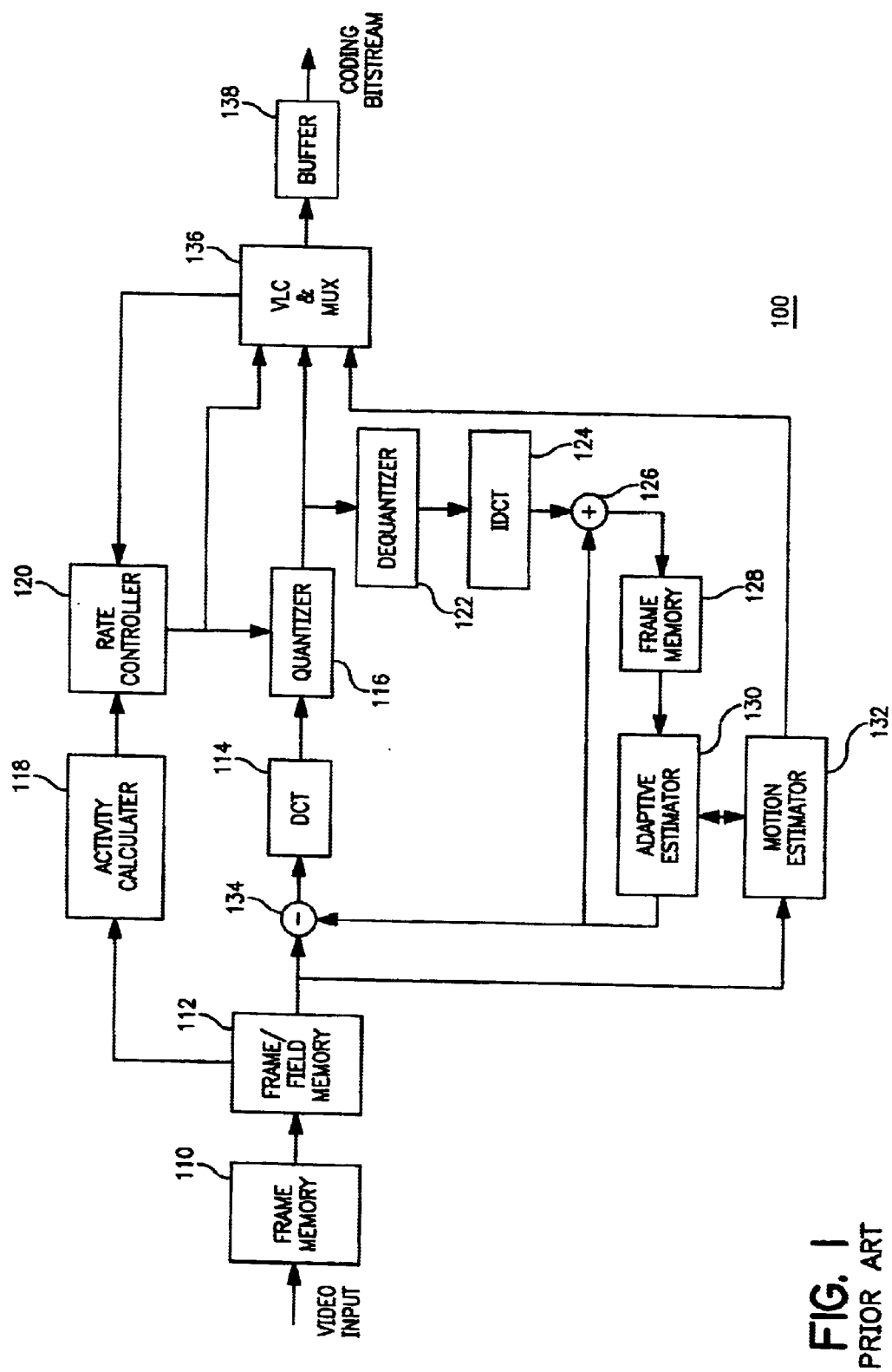
FIG. 1 shows a conventional MPEG2 moving picture encoder.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

Figure 6:
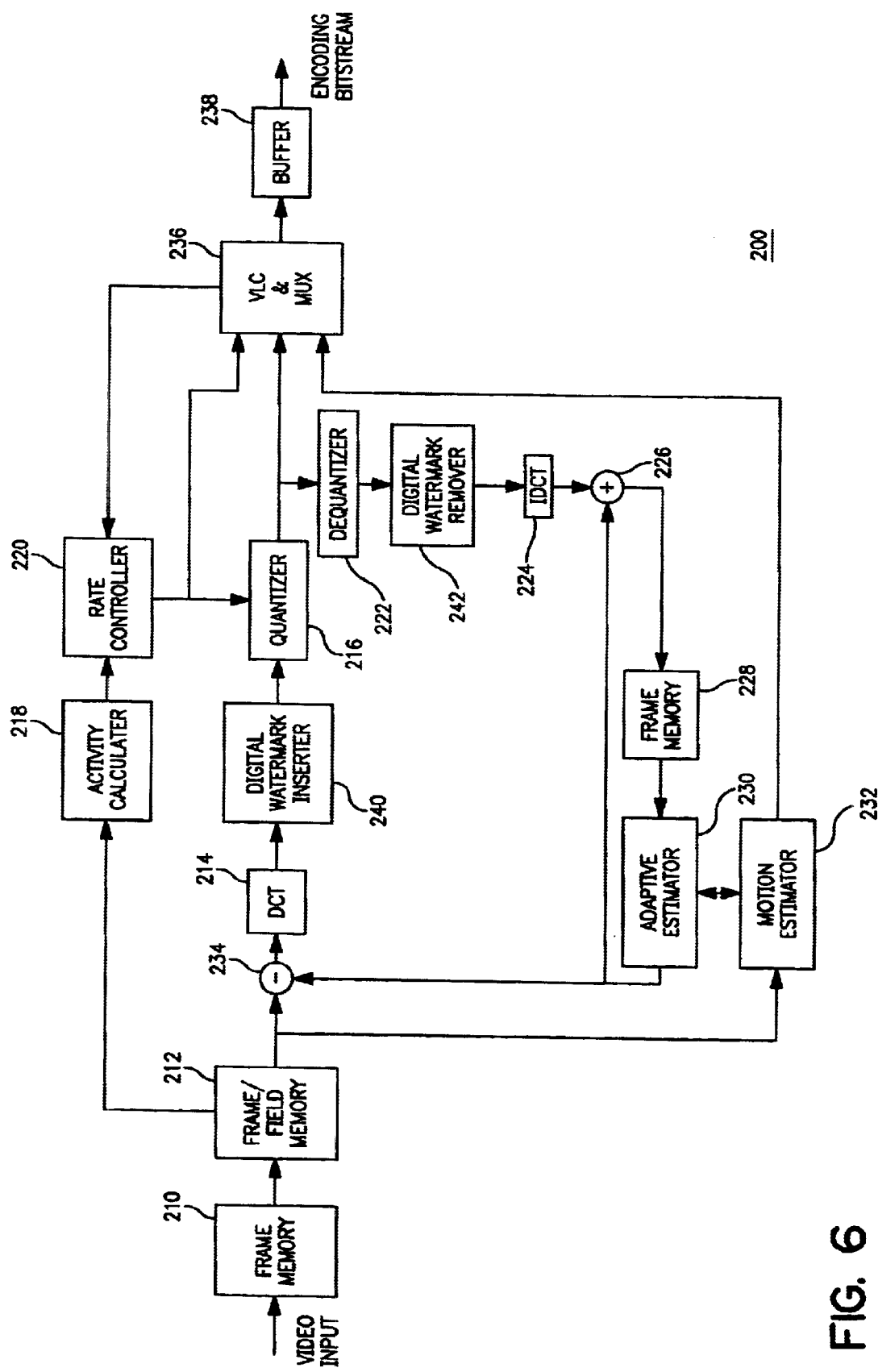
FIG. 6 shows a block diagram of an MPEG2 moving picture encoder according to an embodiment of the present invention.
Figure 7:
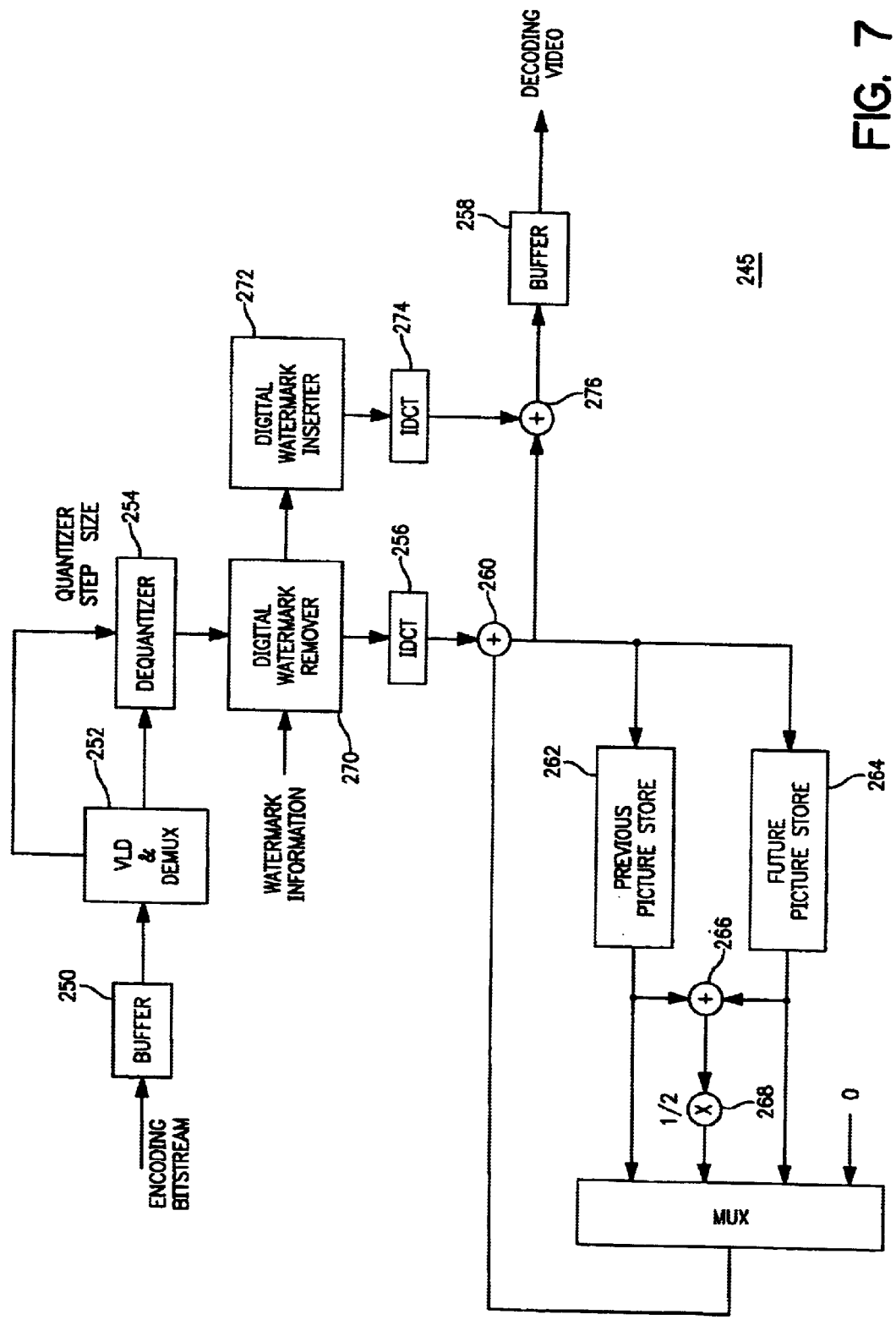
FIG. 7 shows a block diagram of an MPEG2 moving picture decoder according to the embodiment of the present invention.
Figure 8:
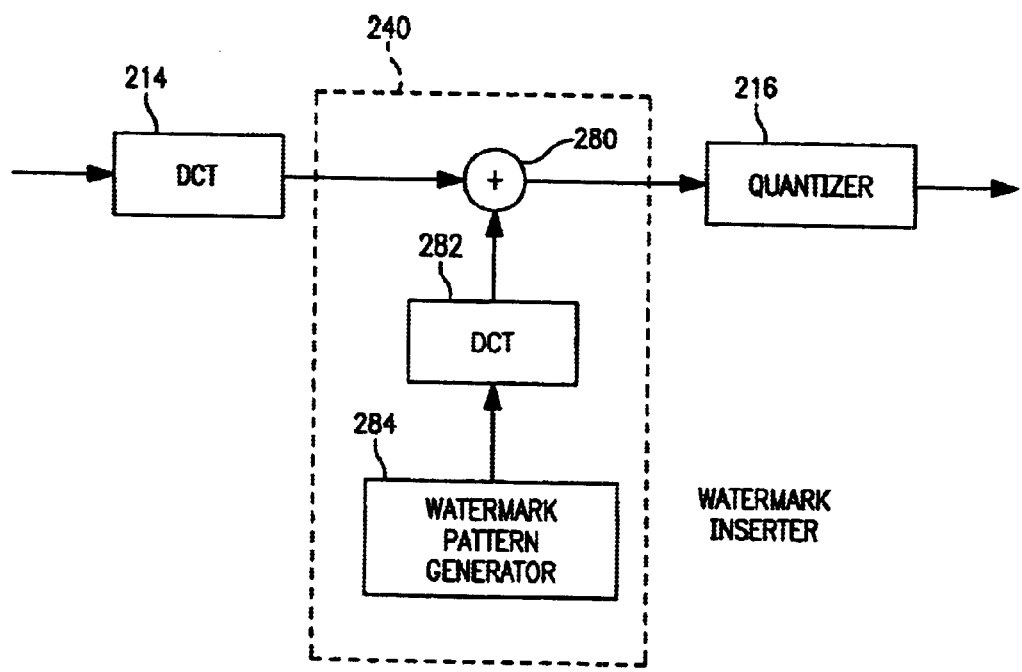
FIG. 8 shows a block diagram of a Discrete Cosine Transform unit, digital watermark inserter and a quantizer shown in FIG. 6.

FIG. 6 illustrates a block diagram of an MPEG2 moving picture encoder 200 according to an embodiment of the present invention and FIG. 7 illustrates a block diagram of an MPEG2 moving picture decoder 245 according to the embodiment of the present invention In FIG. 6, the MPEG2 moving picture encoder includes a frame memory 210, a frame/field memory 212, a subtractor 234, a DCT unit 214, a digital watermark inserter 240, a quantizer 216, an activity calculator 218, a rate controller 220, a dequantizer 222, a digital watermark remover 242, an IDCT 224, an adder 226, a frame memory 228, an adaptive estimator 230, a motion estimator 232, a VLC & MUX 236, and a buffer 238. The frame memory 210, frame/field memory 212, subtractor 234, DCT 214, quantizer 216, activity calculator 218, rate controller 220, dequantizer 222, IDCT 224, adder 226, frame memory 228, adaptation estimator 230, motion estimator 232, VLC & MUX 236 and buffer 238 operate in the same fashion as the frame memory 110, frame/field memory 112, DCT 114, quantizer 116, activity calculator 118, rate controller 120, dequantizer 122, IDCT 124, adder 126, frame memory 128, adaptation estimator 130, motion estimator 132, VLC & MUX 136 and buffer 138, respectively, shown in FIG. 1 and previously described.

The digital watermark inserter 240 makes digital watermark information not removable by a user except an author and is embedded on a frequency domain 8×8 discrete-cosine-transform of the encoded video signal, in order to reduce the burden on hardware. That is, the process of the digital watermark insertion by the digital watermark inserter 240 embeds the watermark information on the frequency domain, so that a duplicator cannot edit or remove a digital product illegally and arbitrarily.

Referring to FIG. 6, the digital watermark inserter 240 is located between the Discrete Cosine Transform (DCT) unit 214 and the variable-length coder & multiplexer (VLC and a MUX) 236 and is also located between the DCT unit 214 and the quantizer 216. It is preferable that the digital watermark inserter 240 is located immediately between the DCT 214 and the quantizer 216 for visual effect.

Because basically the MPEG2 standard embodies a frequency domain processing on the discrete cosine transform, the digital watermark inserter 240 of FIG. 6 discrete-cosine-transforms the digital watermark information, and then embeds the digital watermark information. The watermark information is processed and embedded by in the digital watermark inserter 240 and then is added to an original image. In particular, the digital watermark inserter 240 includes a watermark pattern generator 284 to generate digital watermark information (pattern), and a DCT 282 to discrete-cosine-transform the digital watermark information. The digital watermark inserter 240 further includes an adder 280 which adds the discrete-cosine-transformed digital watermark information from the DCT 282 to the output of the DCT unit 214. The added result from the added 280 is input to the quantizer 216.

Thus, the watermark information embedded on the frequency domain is quantized in the quantizer 216 and is variable-length-coded in the VLC & MUX 236. This is an I picture coding process.

The dequantizer 222 dequantizes the I or P-picture coded data in which the watermark information is embedded and a digital watermark remover 242 gets rid of the embedded watermark information. An IDCT unit 224 reverse-discrete-cosine-transforms the I or P-picture coded data for estimating correctly the motion information. Therefore, the MPEG2 moving picture encoder 200 prevents an error of a temporal domain coding by the watermark information. The MPEG2 moving picture encoder 200 compensates for the error by estimating an image motion that is being input at present from the I or P picture restored like this, and then codes a difference signal.

In this instance, the watermark information is embedded on the spatial domain in the back of the DCT 214. The digital watermark inserter 240 embeds the digital watermark information only on the spatial domain of the discrete cosine transform (on the spatial domain of its frame).

The digital watermark remover 242 removes the digital watermark information on the spatial domain of the discrete cosine transform which was embedded for preventing the error during the motion estimation on the temporal domain for P and B pictures by using the embedded digital watermark information.

FIG. 7 illustrates the MPEG2 moving picture decoder 245 to correctly decode an MPEG2 video stream including the digital watermark information embedded as in the MPEG2 moving picture encoder 200 shown in FIG. 6.

Figure 2:
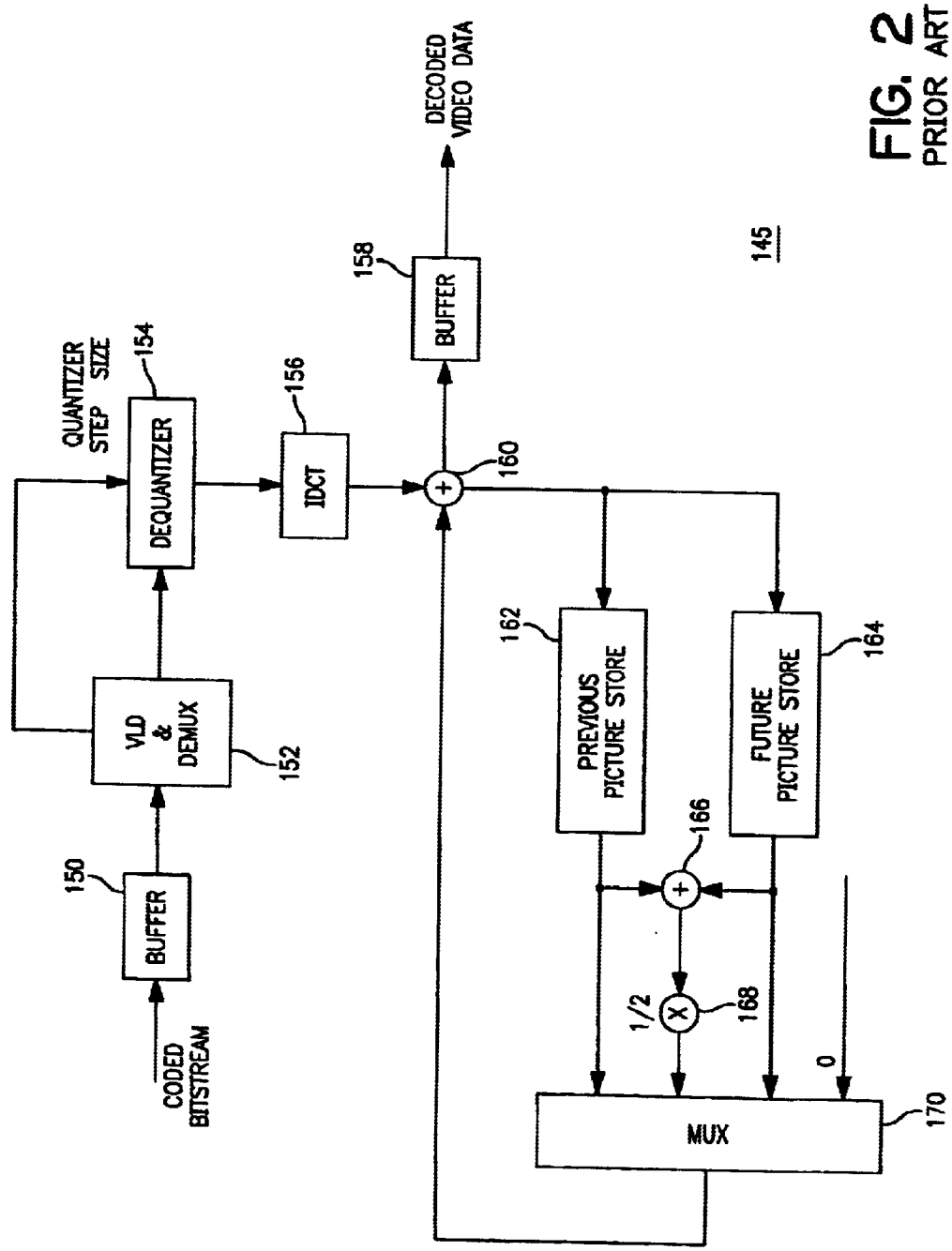
FIG. 2 shows a conventional MPEG2 moving picture decoder.
Figure 3:
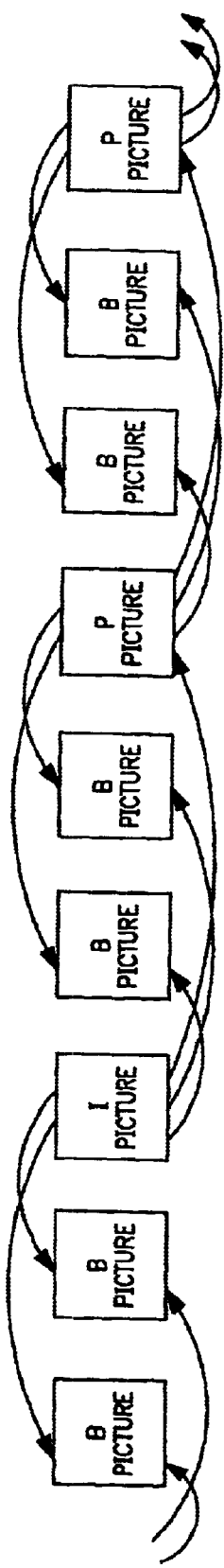
FIG. 3 shows a structure of a video picture used in a conventional MPEG2 moving picture encoder/decoder.
Figure 4:
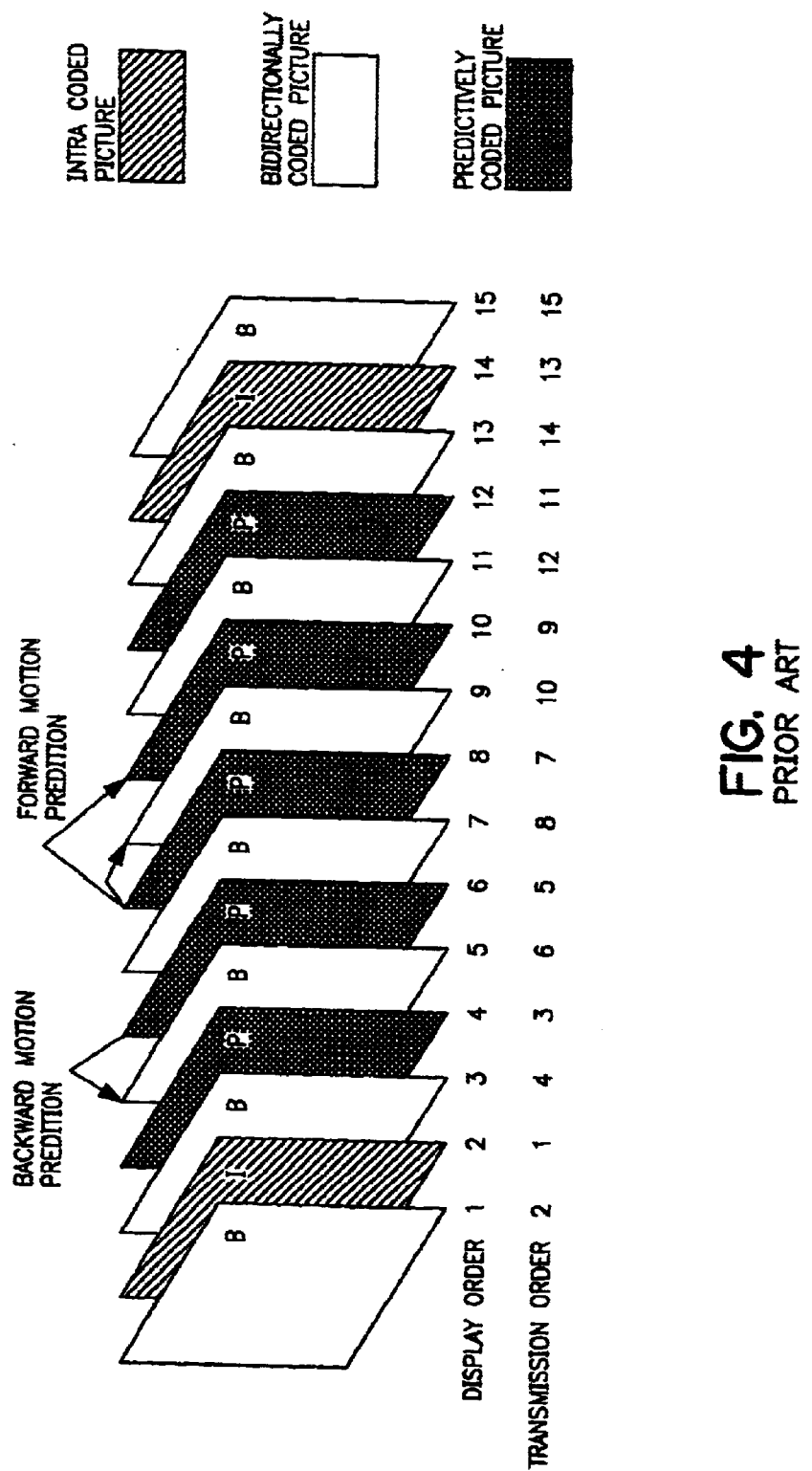
FIG. 4 shows three types of pictures and their relationship under the MPEG2 standard, i.e., I pictures, P predicted pictures, and B bidirectionally predicted pictures.
Figure 5:
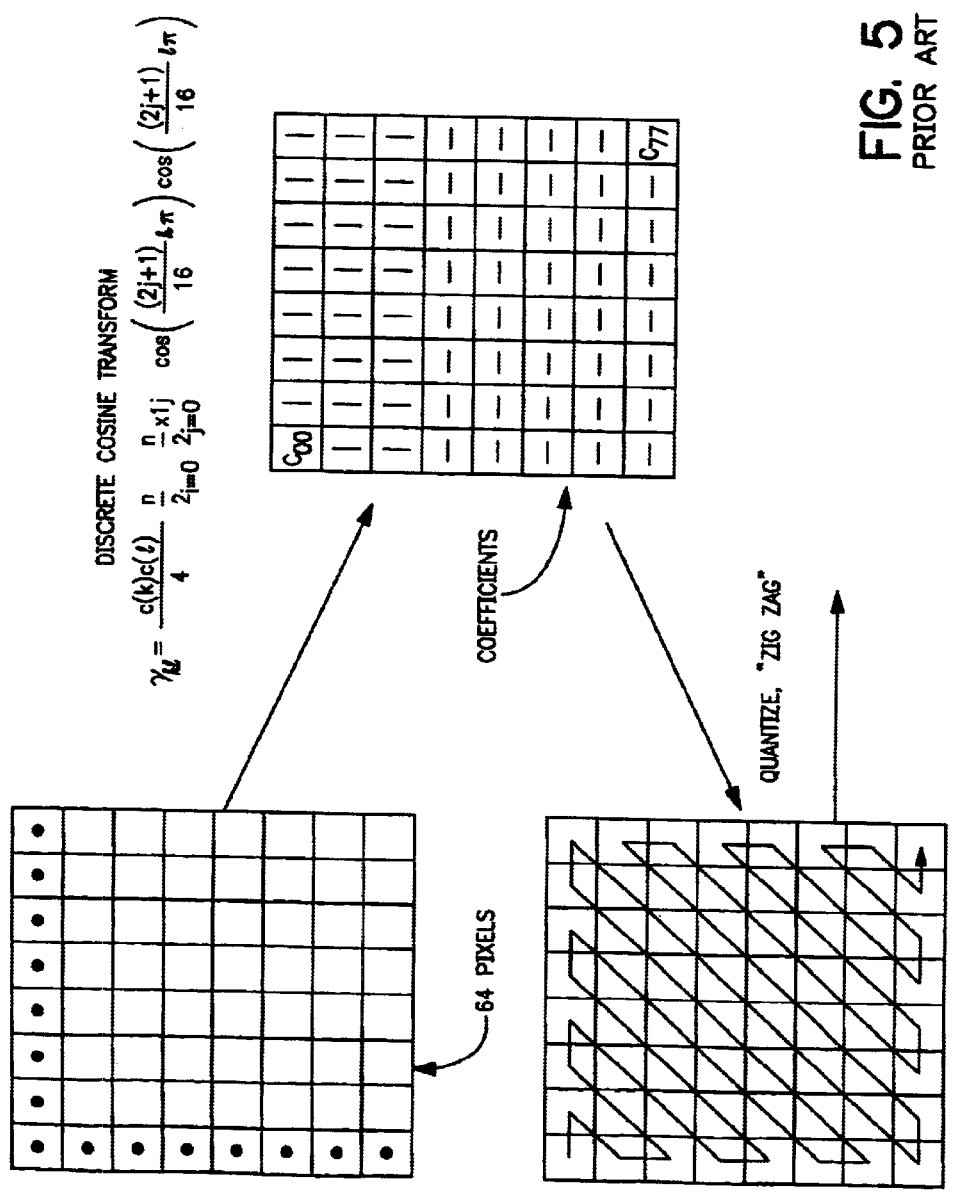
FIG. 5 shows a sequence wherein discrete cosine transform coefficients are calculated and mixed and the discrete cosine transform coefficients are quantized in a zigzag manner.

The MPEG2 moving picture decoder 245 includes a first buffer 250, a VLD & DEMUX 252, a dequantizer 254, a digital watermark remover 270, a first IDCT 256, an adder 260, a previous picture store block 262, future picture store block 264, an adder 266, a ½ multiplier 268, a digital watermark inserter 272, a second IDCT 274, a second buffer 258, and an adder 276. The buffer 250, VLD & DEMUX 252, dequantizer 254, first IDCT 256, second buffer 258, adder 260, previous picture store block 262, future picture store block 264, adder 266, ½ multiplier 268, operate in the same function as the first buffer 150, VLD & DEMUX 152, dequantizer 154, IDCT 156, adder 160, previous picture store block 162, future picture store block 164, adder 166, and ½ adder 168, respectively, shown in FIG. 2 and described above. The digital watermark remover 270 removes the watermark information embedded on the spatial domain of the discrete cosine transform while restoring motion of the P and-B-picture.

The MPEG2 moving picture decoder 245 performs operations in the reverse order of the MPEG2 moving picture encoder 200.

Accordingly in the MPEG2 moving picture decoder 245, the watermark information embedded in the MPEG2 moving picture encoder 200 has to be transmitted.

In the case that an encoded MPEG video stream is transmitted through a storage medium such as a disk, it is possible to perfectly restore motion, referring to it while decoding by embedding the watermark on a lead-in domain which the user cannot access directly.

The digital watermark apparatus according to the present invention for preventing the illegal copying of MPEG2 moving picture data makes it possible to prevent degradation of the image quality and efficiency reduction of encoding by the embedded digital watermark information by decreasing the error while estimating motion of the P and B pictures by using the embedded digital watermark information.

In case of decoding locally for compensating motion, once the embedded watermark information is removed while encoding the I or P picture, and the embedded watermark information is decoded locally, then the embedded watermark information is used as data for motion compensation while decoding the P and B pictures.

And in case of decoding for the decoding output, the MPEG2 moving picture decoder 245 again embeds the watermark information that had been removed once for decoding locally in the image signals, and reverse-discrete-cosine-transforms the image signals to which the watermark information is embedded, and then adds motion compensation data thereto.

Conclusively, the image in which the watermark information is embedded is replayed perfectly. Further, there is an effect of decreasing degradation of the image quality to a maximum extent by restraining an increase of encoding information according to the organization of the present invention as noted above, and that the watermark information is not removed easily by a user, except an author.

What is claimed:

1. An MPEG2 moving picture encoding/decoding system which processes a video input signal of MPEG2 moving picture data, comprising:

an MPEG2 moving picture encoder to an encode a video input signal, said MPEG2 moving picture encoder comprising copy protection means to embed a watermark into the encoded video signal without de-entropy coding the encoded video signal to generate an encoded bit stream; and an MPEG2 moving picture decoder, to decode the encoded bit stream from said moving picture encoder, said decoder comprising means for replaying perfectly the MPEG2 moving picture data of the decoded bit stream into which the watermark is embedded.

2. An MPEG2 moving picture encoding/decoding system which processes a video input signal of MPEG2 moving picture data, comprising:

an MPEG2 moving picture encoder, encoding a video input signal, said MPEG2 moving picture encoder comprising copy protection means for embedding a watermark into the encoded video signal, to generate an encoded bit stream; and an MPEG2 moving picture decoder, to decode the encoded bit stream from said moving picture encoder, said decoder comprising means for replaying perfectly the MPEG2 moving picture data of the decoded bit stream into which the watermark is embedded, wherein said copy protection means comprises:

a Discrete Cosine Transformation (DCT) unit to discrete cosine transform the video input signal;

a digital watermark inserter to embed the watermark discrete-cosine-transformed by said DCT unit on a frequency domain of the discrete cosine transformed video input signal; and a digital watermark remover to remove the embedded digital watermark on a spatial domain of the discrete cosine transformed video input signal, to prevent an error while predicting motion for a P and a B picture on a temporal domain of the discrete cosine transformed video input signal.

3. The MPEG2 moving picture encoding/decoding system as set forth in claim 2, further comprising:

a quantizer to quantize the discrete cosine transformed video input signal including the embedded watermark subsequent to said digital watermark inserter embedding the watermark, wherein said digital watermark inserter is located between said DOT unit and said quantizer.

4. The MPEG2 moving picture encoding/decoding system as set forth in claim 2, further comprising:

a quantizer to quantize the discrete cosine transformed video input signal including the embedded watermark;

a dequantizer to dequantize the discrete cosine transformed video input signal including the embedded watermark output; and a variable length coder and multiplexer to variable length code and multiplex the quantized discrete cosine transformed video input signal including the embedded watermark, a control signal to set up the quantizer to prevent or overflow/underflow and a motion estimation signal to estimate motion of an image of the video input signal;

wherein said digital watermark inserter is located between said quantizer and said variable length coder and multiplexer.

5. The MPEG2 moving picture encoding/decoding system as set forth in claim 3 wherein said digital watermark inserter uses 8×8 DOT to insert said watermark on the frequency domain.

6. The MPEG2 moving picture encoding/decoding system as set forth in claim 2, further comprising an Inverse Discrete Cosine Transform (IDCT) to inverse discrete cosine transform the discrete cosine transformed video input signal with the watermark removed, wherein said IDCT prevents an error on the temporal domain.

7. The MPEG2 moving picture encoding/decoding system as set forth in claim 1, wherein said means of replaying perfectly the MPEG2 moving picture data of the decoded bit stream in which the watermark is embedded, comprises a digital watermark remover, to prevent an error on a temporal domain of the discrete cosine transformed video input signal.

8. The MPEG2 moving picture encoding/decoding system as set forth in claim 7, wherein the copy protection means comprises a digital watermark inserter to embed the watermark in I-picture-codes or P-picture codes of the encoded video signal, and I-picture-codes or P-picture-codes the encoded video signal, and then said digital watermark remover removes the watermark in order to prevent the error of the temporal coding.

9. The MPEG2 moving picture encoding/decoding system as set forth in claim 8, wherein said digital watermark remover correctly predicts motion information of an image related to the encoded video signal.

10. The MPEG2 moving picture encoding/decoding system as set forth in claim 9, wherein the watermark is embedded by the watermark inserter within said moving picture encoder I-picture-codes or P-picture-codes, and then said digital watermark remover removes the watermark, in order to predict exactly said motion information.

11. The MPEG2 moving picture encoding/decoding system as set forth in claim 10, wherein the MPEG2 moving picture decoder receives the watermark from a recording medium.

12. The MPEG2 moving picture encoding/decoding system as set forth in claim 11, wherein said recording medium is a disk.

13. An MPEG2 moving picture encoding/decoding system which processes a video input signal of MPEG2 moving picture data, comprising:

an MPEG2 moving picture encoder, encoding a video input signal, said MPEG2 moving picture encoder comprising copy protection means for embedding a watermark into the encoded video signal, to generate an encoded bit stream; and an MPEG2 moving picture decoder, to decode the encoded bit stream from said moving picture encoder, said decoder comprising means for replaying perfectly the MPEG2 moving picture data of the decoded bit stream into which the watermark is embedded, wherein said means of replaying perfectly the MPEG2 moving picture data of the decoded bit stream in which the watermark is embedded, comprises a digital watermark remover, to prevent an error on a temporal domain of the discrete cosine transformed video input signal, the copy protection means comprises a digital watermark inserter to embed the watermark in I-picture-codes or P-picture codes of the encoded video signal, and I-picture-codes or P-picture-codes the encoded video signal, and then said digital watermark remover removes the watermark, in order to prevent the error of the temporal domain coding, said digital watermark remover correctly predicts motion information of an image related to the encoded video signal, the watermark is embedded by the watermark inserter within said moving picture encoder I-picture-codes or P-picture-codes, and then said digital watermark remover removes the watermark, in order to predict exactly said motion information, the MPEG2 moving picture decoder receives the watermark from a recording medium, and said watermark is embedded into a domain which a user cannot access directly and a correct motion restoration is performed by reference to the digital watermark when embedding and decoding said watermark.

14. The MPEG2 moving picture encoding/decoding system as set forth in claim 13, wherein the domain, which the user can not access directly, is a lead-in domain.

15. The MPEG2 moving picture encoding/decoding system as set forth in claim 14, wherein said decoder has a function to increase encoding efficiency by using the embedded watermark.

16. The MPEG2 moving picture encoding/decoding system as set forth in claim 15, wherein said decoder for carrying out the function decreases an error while predicting motion of P and B pictures by using the embedded watermark.

17. An MPEG2 moving picture encoding/decoding system which processes a video input signal of MPEG2 moving picture data, comprising:

an MPEG2 moving picture encoder, encoding a video input signal, said MPEG2 moving picture encoder comprising copy protection means for embedding a watermark into the encoded video signal without de-entropy coding the encoded video signal so as to generate an encoded bit stream; and an MPEG2 moving picture decoder, to decode the encoded bit stream from said moving picture encoder, said decoder comprising means for replaying perfectly the MPEG2 moving picture data of the decoded bit stream into which the watermark is embedded, wherein said decoder prevents degradation of image quality by removing the embedded watermark.

18. The MPEG2 moving picture encoding/decoding system as set forth in claim 17, wherein said encoder further comprises a watermark compensation unit that decreases the error while predicting motion of the P and B pictures by using the embedded watermark.

19. An encoder which compresses a video signal by removing redundancy information in accordance with using an interrelation of data on a spatial domain and a temporal domain of the video signal, comprising:

a digital watermark inserter to generate and embed a digital watermark on a frequency domain of the video signal that has not been de-quantized in the encoder; and a variable length coder to variable length code the video signal including the embedded digital watermark.

20. The encoder as claimed in claim 19, further comprising a Discrete Cosine Transform (DCT) unit to discrete-cosine-transform the video signal, wherein the digital watermark inserter discrete-cosine-transforms the digital watermark and embeds the discrete-cosine-transformed digital watermark on the frequency domain of the discrete-cosine-transformed video signal.

21. An encoder which compresses a video signal by removing redundancy information in accordance with using an interrelation of data on a spatial domain and a temporal domain of the video signal, comprising:
   a digital watermark inserter to generate and embed a digital watermark on a frequency domain of the video signal; and
   a variable length coder to variable length code the video signal including the embedded digital watermark,
   further comprising a Discrete Cosine Transform (DCT) unit to discrete-cosine-transform the video signal, wherein the digital watermark inserter discrete-cosine-transforms the digital watermark and embeds the discrete-cosine-transformed digital watermark on the frequency domain of the discrete-cosine-transformed video signal, and
   further comprising:
      a motion estimator to estimate motion on the temporal domain for P and B pictures of the video signal; and
      a digital watermark remover to remove the digital watermark on a spatial domain of the discrete-cosine-transformed video signal, so as to prevent an error during the motion estimation on the temporal domain.

22. An encoder which compresses a video signal by removing redundancy information in accordance with using an interrelation of data on a spatial domain and a temporal domain of the video signal, comprising:
   a digital watermark inserter to generate and embed a digital watermark on a lead-in domain of the video signal which is inaccessible directly by a user; and
   a variable length coder to variable length code the video signal including the embedded digital watermark,
   wherein the video signal has not been variable length coded in the encoder prior to being received by said digital watermark inserter.

23. An MPEG2 moving picture decoder which processes an encoded bitstream of a video signal with an embedded watermark, comprising:
   a decoder to decode the encoded bitstream into the video signal, said decoder including a watermark remover to remove an embedded watermark such that the video signal is without the watermark; and
   a watermark inserter to decode and insert the removed watermark into the decoded video signal.

24. The MPEG-2 moving picture decoder of claim 23, wherein the MPEG2 moving picture decoder further prevents degradation of image quality by using the embedded watermark inserted by said watermark inserter.

25. The MPEG-2 moving picture decoder of claim 23, wherein said decoder comprises:
   a variable length decoder and a demultiplexer to variable length decode and demultiplex the bitstream;
   a dequantizer to dequantize the variable length decoded and demultiplexed bitstream;
   a first inverse discrete cosine transform to inverse discrete cosine transform the dequantize the dequantized bitstream; and
   a device to receive the inverse discrete cosine transformed bitstream from said first inverse discrete cosine transform and to reproduce the video signal,
   wherein the watermark remover removes the watermark prior to being inverse discrete cosine transformed by said first inverse discrete cosine transform.

26. The MPEG 2 moving picture decoder of claim 25, said watermark inserter comprises a second inverse discrete cosine transform to inverse discrete cosine transform the removed watermark prior to be inserted into the decoded video signal.

27. The MPEG-2 moving picture decoder of claim 26, wherein the MPEG2 moving picture decoder further prevents degradation of image quality by using the embedded watermark inserted by said watermark inserter.

* * * * *

UNITED STATES PATENT AND TRADEMARK OFFICE
CERTIFICATE OF CORRECTION

PATENT NO. : 6,621,933 B2
DATED : September 16, 2003
INVENTOR(S) : Tae-yun Chung et al.

It is certified that error appears in the above-identified patent and that said Letters Patent is hereby corrected as shown below:

Column 10,
Line 57, change "DOT" to -- DCT --;

Column 11,
Line 11, change "DOT" to -- DCT --.
Line 32, insert -- , -- after "watermark";

Column 12,
Line 45, insert paragraph return after "stream";

Column 14,
Line 32, change "MPEG 2" to -- MPEG-2 --.

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,621,933 B2
DATED : September 16, 2003
INVENTOR(S) : Chung et al.

Page 1 of 1

It is certified that error appears in the above-identified patent and that said Letters Patent is hereby corrected as shown below:

Column 14,
Line 24, delete "the dequantized", second occurrence; and
Line 28, after "signal" insert -- in accordance with previous and future pictures --.

Signed and Sealed this

Eleventh Day of April, 2006

JON W. DUDAS
*Director of the United States Patent and Trademark Office*